(12) United States Patent
Suman et al.

(10) Patent No.: US 11,010,040 B2
(45) Date of Patent: May 18, 2021

(54) SCROLLABLE ANNOTATIONS ASSOCIATED WITH A SUBSET OF CONTENT IN AN ELECTRONIC DOCUMENT

(71) Applicant: Microsoft Technology Licensing, LLC, Redmond, WA (US)

(72) Inventors: Apurv Suman, Seattle, WA (US); Benjamin Bunker, Maple Value, WA (US); Allison Hirt, Seattle, WA (US); Elaine Law, Remond, WA (US); Lee Chang, Woodinville, WA (US); Robin Emily Wakefield, Seattle, WA (US); Sophia Vennix, Issaquah, WA (US); Victor Kozyrev, Issaquah, WA (US); Yu-Hsuan Wang, Kirkland, WA (US); Brian Rhoades, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/288,818

(22) Filed: Feb. 28, 2019

(65) Prior Publication Data

US 2020/0278788 A1 Sep. 3, 2020

(51) Int. Cl.
*G06F 3/0485* (2013.01)
*G06F 40/169* (2020.01)
*G06F 3/0482* (2013.01)

(52) U.S. Cl.
CPC ........ *G06F 3/04855* (2013.01); *G06F 3/0482* (2013.01); *G06F 40/169* (2020.01)

(58) Field of Classification Search
CPC .... G06F 40/106; G06F 40/134; G06F 40/166; G06F 40/169; G06F 3/0482;

(Continued)

(56) References Cited

U.S. PATENT DOCUMENTS 5,689,717 A * 11/1997 Pritt ........................ G06T 11/00
345/619
8,745,067 B2 * 6/2014 Cierniak ................. G06F 16/22
715/232

(Continued)

OTHER PUBLICATIONS

Jakob Nielson, "Scrolling and Scrollbars," copyright 2005, published by NN/g Nielsen Norman Group, https://www.nngroup.com/articles/scrolling-and-scrollbars/, pp. 1-5. (Year: 2005).*

(Continued)

*Primary Examiner* — Ariel Mercado
(74) *Attorney, Agent, or Firm* — Michael Best & Friedrich LLP

(57) ABSTRACT

Systems and methods for displaying annotations associated with an electronic document. One system includes an electronic computing device with an electronic processor configured to display a user interface on a display device. The user interface includes a canvas displaying a first subset of content included in the electronic document and a region scrollable independent from the canvas. The electronic processor is also configured to display a first plurality of annotations in the region. Each of the first plurality of annotations are associated with an anchor within the first subset of the content and displayed spaced within the region in at least one dimension based on spacing of the associated anchors. The electronic processor is further configured to change the region to display a second plurality of annotations in the region in response to changing the canvas to display a second subset of the content included in the electronic document.

20 Claims, 12 Drawing Sheets

(58) Field of Classification Search
CPC .... G06F 3/0485; G06F 3/04842; G06F 16/93; G06F 16/954; H04L 51/16
See application file for complete search history.

(56) References Cited

U.S. PATENT DOCUMENTS

| | | | |
|---|---|---|---|
| 2004/0194021 A1* | 9/2004 | Marshall | G06F 40/169 |
| | | | 715/232 |
| 2004/0205542 A1* | 10/2004 | Bargeron | G06F 40/169 |
| | | | 715/201 |
| 2009/0199082 A1 | 8/2009 | Hollander et al. | |
| 2013/0031449 A1* | 1/2013 | Griffiths | G06F 40/14 |
| | | | 715/205 |
| 2013/0191711 A1* | 7/2013 | Tashman | G06F 40/103 |
| | | | 715/205 |
| 2013/0191720 A1 | 7/2013 | Simons et al. | |
| 2015/0339282 A1* | 11/2015 | Goyal | H04N 5/262 |
| | | | 715/229 |
| 2016/0277328 A1* | 9/2016 | Ishizuka | H04N 21/8547 |
| 2017/0034107 A1* | 2/2017 | Krishnaswamy | H04L 51/32 |
| 2017/0249384 A1* | 8/2017 | Kandylas | G06F 40/169 |

OTHER PUBLICATIONS

"International Search Report and Written Opinion Issued in PCT Application No. PCT/US20/017109", dated Apr. 20, 2020, 10 Pages.

* cited by examiner

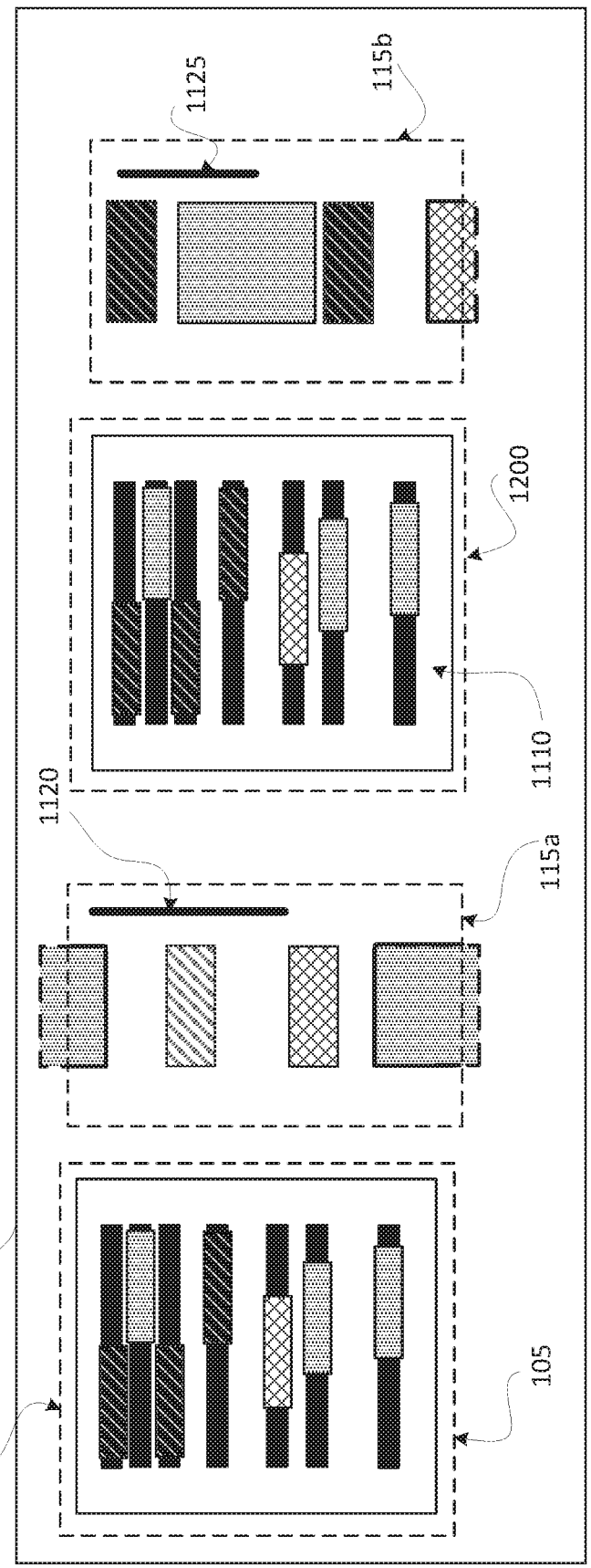

SCROLLABLE ANNOTATIONS ASSOCIATED WITH A SUBSET OF CONTENT IN AN ELECTRONIC DOCUMENT

FIELD

Embodiments described herein relate to displaying annotations associated with an electronic document and, in particular, relate to providing a scrollable region of annotations within a user interface displaying an electronic document, wherein the annotations included in the scrollable region are associated with a subset of content of the electronic document.

SUMMARY

Annotations have become an important feature in productivity software, such as Word® and PowerPoint® provided by Microsoft Corporation. Annotations are used by individual users working alone to create electronic documents and by groups of users collaborating to create electronic documents. In one example, an individual user may make annotations in an electronic document to track edits, provide comments regarding the electronic document, or a combination thereof. In another example, collaborating users may use annotations to convey their opinions regarding particular areas of an electronic document to other collaborators.

When content includes a large number of annotations, which is common in collaboration environments, the annotations create noise and clutter the electronic document, which may make it difficult for a user to identify or locate relevant annotations. Although some methods of displaying annotations have sought to address these problems, there are still deficiencies. For example, as illustrated in FIG. 1, to conserve space and reduce clutter in an electronic document, annotations for an electronic document can be hidden and hints or other types of icons can be included in the document to represent that an annotation exists but is not currently being displayed. In particular, in the example illustrated in FIG. 1, hints 200 are represented as speech bubble icons and are displayed adjacent to content 205 within the electronic document that the annotation is associated with. When a user selects the hint 200, such as with an input device, the annotation associated with the hint 200 is displayed. Although using hints as illustrated in FIG. 1 helps keep the electronic document from becoming cluttered, a user is forced to select hints to view content associated with the annotation. This becomes cumbersome in electronic documents with a large number of annotations.

Rather than hiding annotations as illustrated in FIG. 1, annotations can be (by default) displayed but it becomes harder to display such fully-displayed annotations adjacent to the associated content. Accordingly, as illustrated in FIG. 2, annotations (including truncated annotations) can be displayed within an electronic document and each annotation can be (visually or graphically) linked with the content in the electronic document the annotation is associated with. In particular, in FIG. 2, the annotation 300 and the content 305 are illustrated with a line 310 representing that the annotation 300 is associated with (relates to) the content 305. Although using lines keeps annotations linked with the associated content, as the number of annotations becomes large (and the associated number of lines increases) it often becomes difficult for a user to identify which annotation is associated with which content. Furthermore, as the number of annotations increases, the space constraints of the electronic document prevent all of the annotations from being displayed. Accordingly, all or some of the annotations can be collapsed or truncated so that only a portion of an annotation is displayed with the electronic document. Thus, to view the full content of an annotation, a user is forced to select the annotation, which creates the same deficiencies as described above with respect to the hints.

To allow annotations to be displayed without truncation, the annotations can be displayed in a separate pane. For example, FIG. 3 illustrates a pane 400 displayed alongside a canvas 405 for displaying annotations. The pane 400 allows a large number of annotations to be displayed without the need for truncation. However, as illustrated in FIG. 4, because the pane 400 is separate from the canvas 405, it is difficult for users to determine content displayed within the canvas 405 that an annotation included in the pane 400 is associated with. For example, to determine the content that an annotation is associated with, a user has to select the annotation within the pane 405, which causes the canvas 405 to display the associated content.

Thus, existing methodologies for displaying annotations fail to address the need to effectively display extensive annotation content alongside associated content. As collaboration environments become more commonplace and often include many collaborators, this problem is only compounded and, without a proper solution, annotations (including annotations that may be more important or critical than the content itself) can easily become lost or overlooked. Given at least the above deficiencies, embodiments described herein provide systems and methods for displaying annotations associated with an electronic document that allow a user to view annotations and associated content links without having to select the annotation or take other additional acts. These embodiments improve the user interface and user experience by making it easier for a user to navigate annotations included in an electronic document and more efficiently edit the electronic document. In particular, the embodiments described herein retain annotations proximally located to their associate content, do not require users to select or click on annotations for annotations to be useful, and handle large amounts of annotations. Given this improved navigation, users spend less time editing documents and create fewer versions of a document, which results in reduced and more efficient use of computing resources. Furthermore, the improved user interface accounts for different display device sizes, which may further impact how annotations are displayed.

One embodiment provides a system for displaying annotations associated with an electronic document. The system includes an electronic computing device and the electronic computing device includes an electronic processor. The electronic processor is configured to display a user interface on a display device. The user interface includes a canvas displaying a first subset of content included in the electronic document and a region scrollable independent from the canvas. The electronic processor is also configured to display a first plurality of annotations in the region. Each of the first plurality of annotations are associated with an anchor within the first subset of the content and each of the first plurality of annotations are displayed spaced within the region in at least one dimension based on spacing of the associated anchors within the first subset of the content. The electronic processor is further configured to change the region to display a second plurality of annotations in the region in response to changing the canvas to display a second subset of the content included in the electronic document. Each of the second plurality of annotations are displayed spaced within the region in at least one dimension based on spacing of the associated anchors within the second subset of the content.

Another embodiment provides a method for displaying annotations associated with an electronic document. The method includes displaying, with an electronic processor, a user interface on a display device. The user interface includes a canvas and a region. The canvas displays a first subset of content included in the electronic document and the region is scrollable independent from the canvas. The method also includes displaying, with the electronic processor, a first plurality of annotations in the region. Each of the first plurality of annotations are associated with an anchor within the first subset of the content and each of the first plurality of annotations are displayed spaced within the region in at least one dimension based on spacing of the associated anchors within the first subset of the content. The method further includes changing, with the electronic processor, the region to display a second plurality of annotations in the region in response to changing the canvas to display a second subset of the content included in the electronic document. Each of the second plurality of annotations are displayed spaced within the region in at least one dimension based on spacing of the associated anchors within the second subset of the content.

A further embodiment provides non-transitory, computer-readable medium including instructions executable by a processor to perform a set of functions. The set of functions includes displaying a user interface on a display device. The user interface includes a canvas displaying a first subset of content included in the electronic document and a region scrollable independent from the canvas. The set of functions also includes displaying a first plurality of annotations in the region. Each of the first plurality of annotations are associated with an anchor within the first subset of the content and each of the first plurality of annotations are displayed spaced within the region in at least one dimension based on spacing of the associated anchors within the first subset of the content. The set of functions further includes changing the region to display a second plurality of annotations in the region in response to changing the canvas to display a second subset of the content included in the electronic document. Each of the second plurality of annotations are displayed spaced within the region in at least one dimension based on spacing of the associated anchors within the second subset of the content.

BRIEF DESCRIPTION OF THE DRAWINGS

FIGS. 9-12 illustrate a user interface displaying a plurality of annotations according to some embodiments.

DETAILED DESCRIPTION

Figure 1:
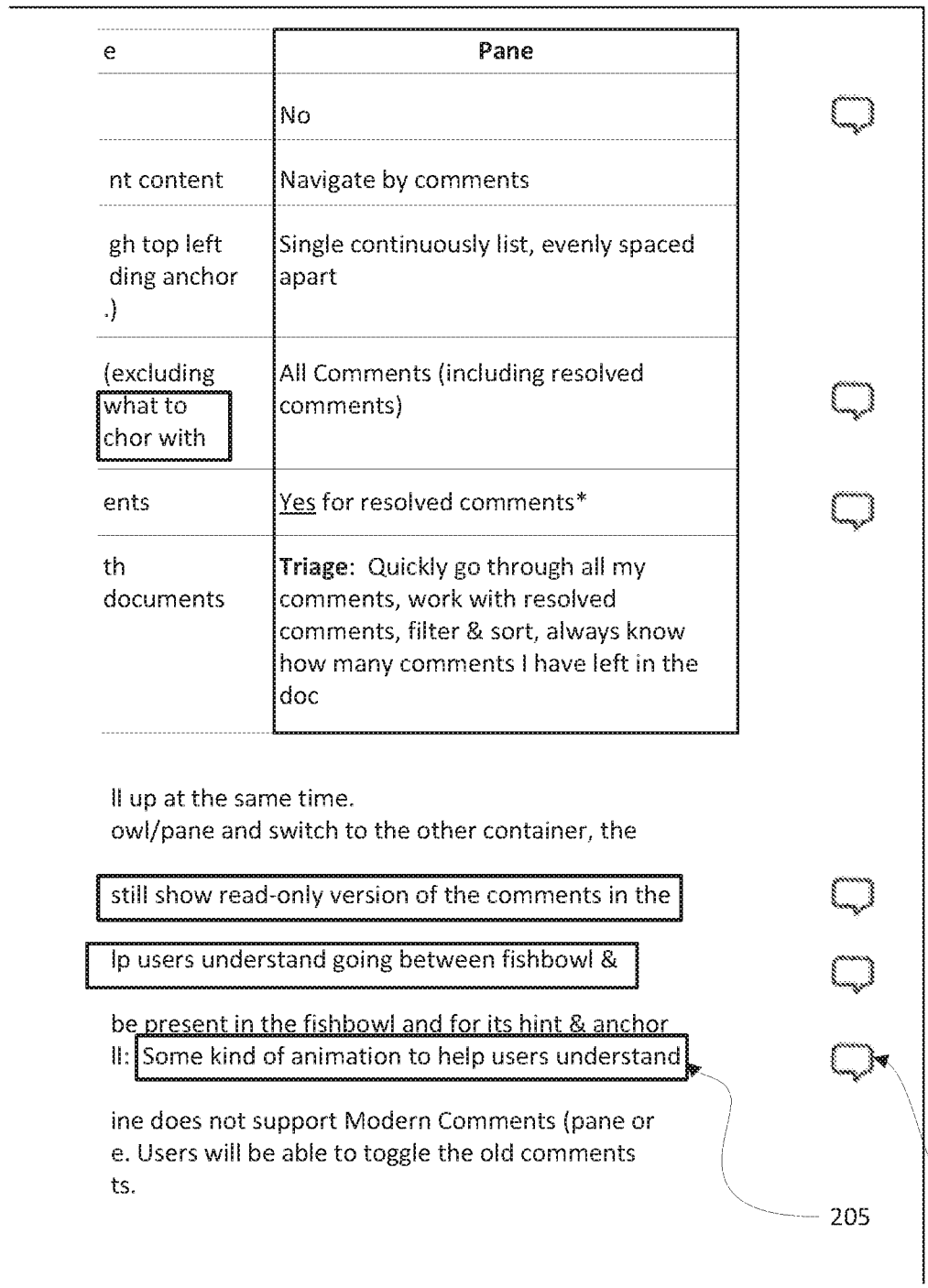
FIG. 1 illustrates a user interface displaying annotations associated with an electronic document by hiding the annotations with hints.
Figure 2:
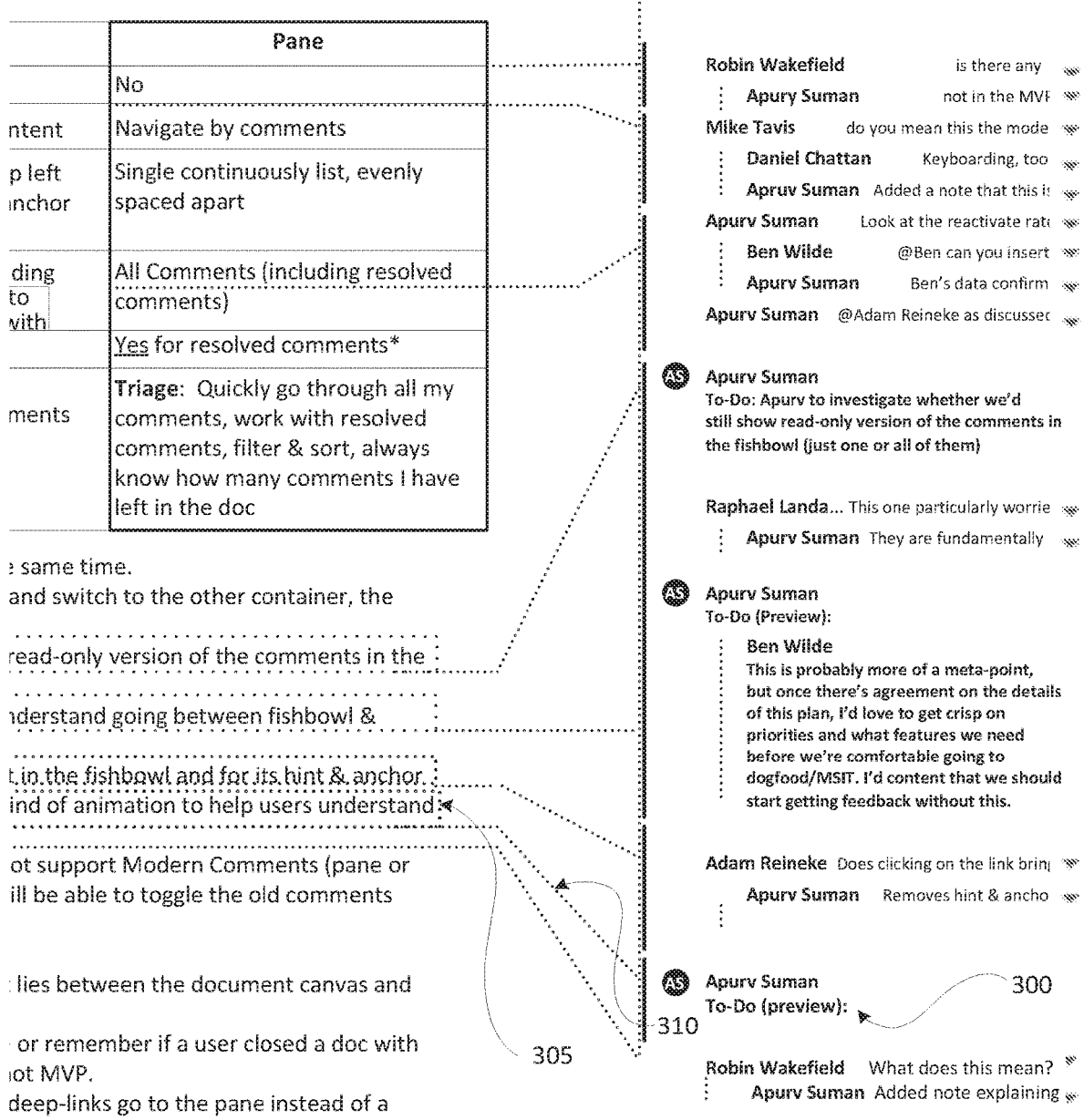
FIG. 2 illustrates a user interface displaying annotations associated with an electronic document by collapsing or truncating the annotations so that only some or none of the content associated with each annotation is displayed unless selected.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, embodiments described herein provide methods and systems for displaying annotations associated with an electronic document. As also noted above, hiding or truncating annotations makes it difficult and inefficient for users to identify and navigate to relevant annotations. Furthermore, although moving annotations to a separate pane addresses the space constraints with displaying annotation, moving annotations to this pane fails to provide links between the annotations and the associated content in the electronic document. Thus, embodiments described herein display annotations in a scrollable region, wherein the annotations included in the scrollable region are associated with a subset of content of an electronic document, such as a page of an electronic document. For example when a page of an electronic document is displayed, annotations associated with the page are included in region adjacent to the page. A user can scroll through the annotations in the region if there are too many annotations associated with a page to display in the region at once. However, in some embodiments, a user cannot view annotations that are not associated with a displayed subset of the content (for example, associated with a different page of the electronic document). Accordingly, by limiting the number of annotations included in the scrollable region, more annotations can be displayed. Furthermore, the spacing of the annotations within the region provides information regarding what content included in the electronic document is associated with each annotation. For example, when the region is provided vertically to one side of the displayed content, the vertical spacing between annotations displayed in the region is based on the vertical spacing between the content associated with the annotations. Accordingly, rather than having a separate pane with a continuous list of annotations, the annotations in the scrollable region are spaced to represent their relationship with content. Thus, even as a user scrolls through the region, the region continues to provide (visually) linking information between the annotations and the associated content.

Figure 4:
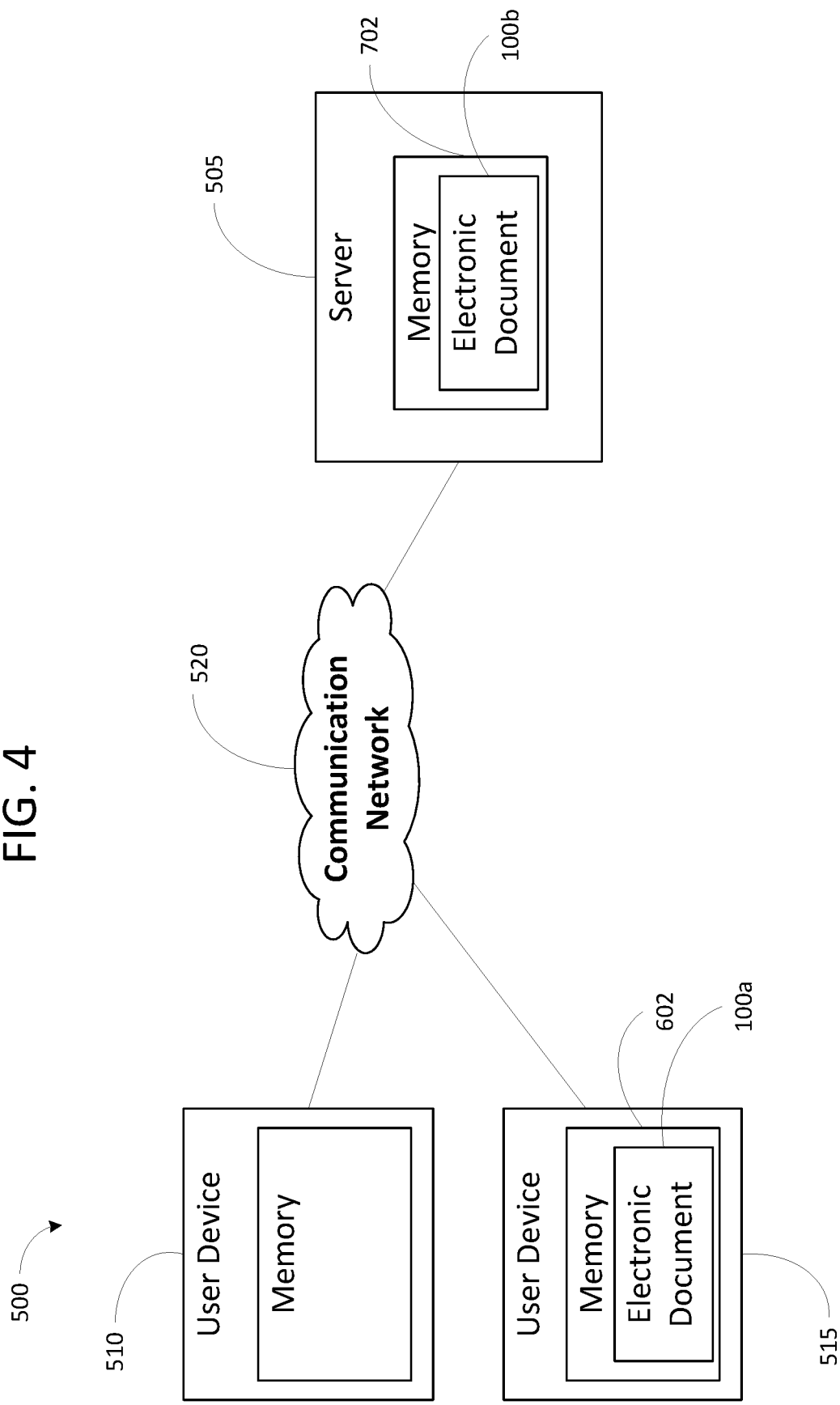
FIG. 4 schematically illustrates a system for displaying annotations associated with an electronic document according to some embodiments.

FIG. 4 schematically illustrates an example system 500 for displaying annotations associated with an electronic document. The system 500 illustrated in FIG. 4 includes a server 505 and one or more user devices 510, 515. The server 505 and the user devices 510, 515 communicate over one or more wired or wireless communication networks 520. Portions of the wireless communication networks 520 may be implemented using a wide area network, such as the Internet, a local area network, such as a Bluetooth™ network or Wi-Fi, and combinations or derivatives thereof. It should be understood that the server 505 may communicate with any number of user devices, and the two user devices 510, 515 illustrated in FIG. 4 are purely for illustrative purposes. Similarly, it should also be understood that the system 500 may include any number of servers and the single server 505 illustrated in FIG. 4 is purely for illustrative purposes. Also, in some embodiments, one of the user devices 510, 515 may communicate with the server 505 through one or more intermediary devices (not shown).

Figure 5:
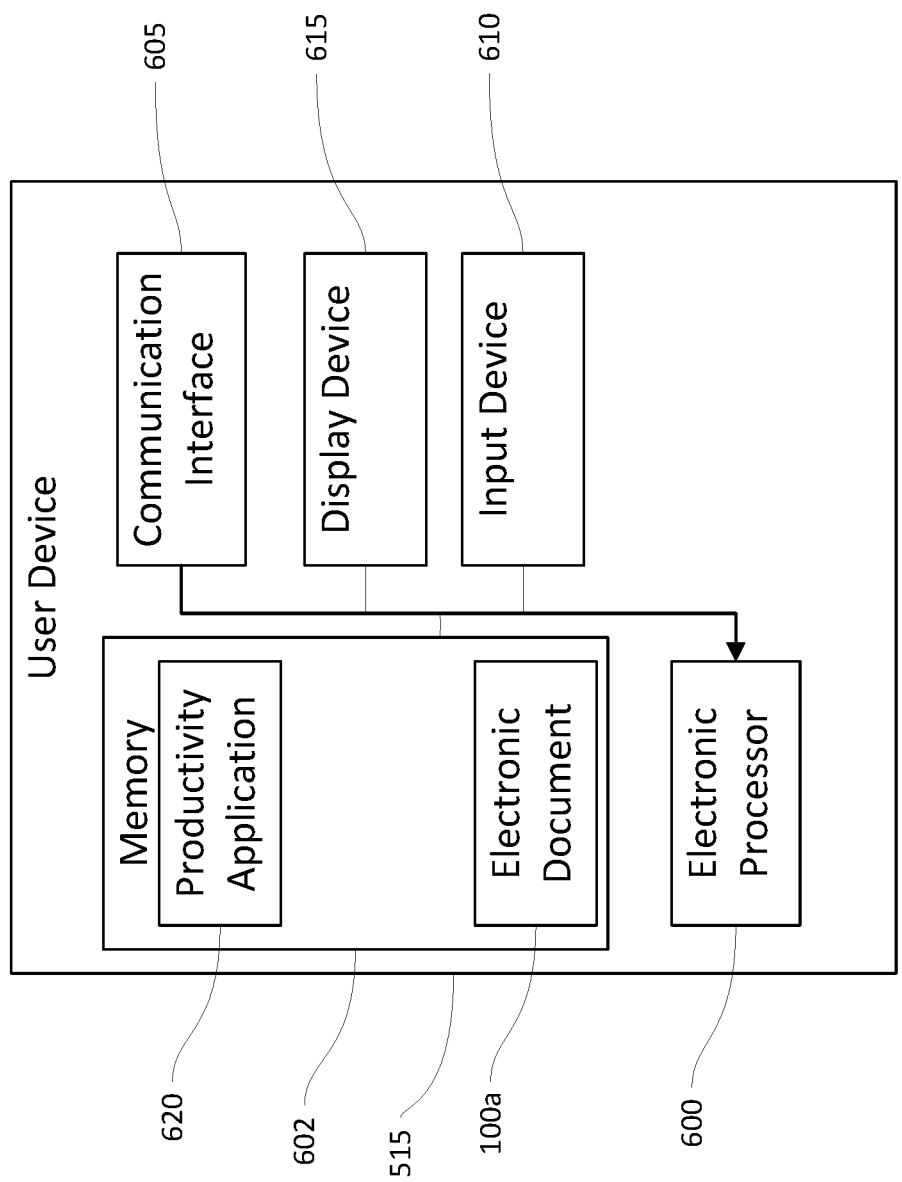
FIG. 5 schematically illustrates a user device included in the system of FIG. 4 according to some embodiments.

FIG. 5 schematically illustrates the user device 515 according to some embodiments. As illustrated in FIG. 5, the user device 515 is electronic computing device that includes an electronic processor 600 (for example, a microprocessor, application-specific integrated circuit (ASIC), or another suitable electronic device), a memory 602 (a non-transitory, computer-readable storage medium), and a communication interface 605, such as a transceiver, for communicating over the communication network(s) 520 and, optionally, one or more additional communication networks or connections.

The communication interface 605 allows the user device 515 to communicate with the server 505 over the communication network(s) 520.

The user device 515 also includes an input device 610 and a display device 615. The display device 615 may include, for example, a touchscreen, a liquid crystal display ("LCD"), a light-emitting diode ("LED"), a LED display, an organic LED ("OLED") display, an electroluminescent display ("ELD"), and the like. The input device 610 may include, for example, a keypad, a mouse, a touchscreen (for example, as part of the display device 615), a microphone, a camera, or the like (not shown). The electronic processor 600, the memory 602, the communication interface 605, the input device 610, and the display device 615 communicate wirelessly, over one or more communication lines or buses, or a combination thereof. It should be understood that the user device 515 may include additional components than those illustrated in FIG. 5 in various configurations and may perform additional functionality than the functionality described herein. For example, in some embodiments, the user device 515 includes multiple electronic processors, multiple memories, multiple communication interfaces, multiple input devices, multiple output devices, or a combination thereof. Also, it should be understood that, although not described or illustrated herein, the user device 510 may include similar components and perform similar functionality as the user device 515.

As illustrated in FIG. 5, the memory 602 included in the user device 515 includes a productivity application 620. When executed by the electronic processor 600, the productivity application 620 performs a set of functions, including the methods described herein. For example, as described in more detail below, the productivity application 620 generates and outputs (for display via the display device 615) one or more user interfaces for displaying content included in an electronic document and tools for editing or creating such content, including creating and editing annotations associated with such content.

In some embodiments, the productivity application 620 includes a stand-alone application, such as Word® provided by Microsoft Corporation. In this situation, the productivity application 620, when executed by the electronic processor 600, accesses an electronic document 100a (for example, also stored in the memory 602 or a separate memory included in the user device 515) and displays the electronic document 100a as described herein. In other embodiments, the productivity application 620 includes an application for accessing a productivity application or productivity services provided via other devices. For example, in some embodiments, the productivity application 620 includes a browser application, such as Internet Explorer® provided by Microsoft Corporation, to access a productivity application executed by a separate device, such as the server 505. Similarly, in some embodiments, the productivity application 620 installed on the user device 515 includes a dedicated client application (for example, a thin client application) for accessing productivity functions from a server or cloud service. For example, in some embodiments, all or a portion of functionality described herein as being performed by the productivity application 620 locally-installed on the user device 515 is performed by a server or cloud service and the user device 515 executes a browser application or other client application to access the functionality described herein. It should be also be understood that the functionality described herein as being performed by the productivity application 620 may be distributed among multiple applications or software components.

Figure 6:
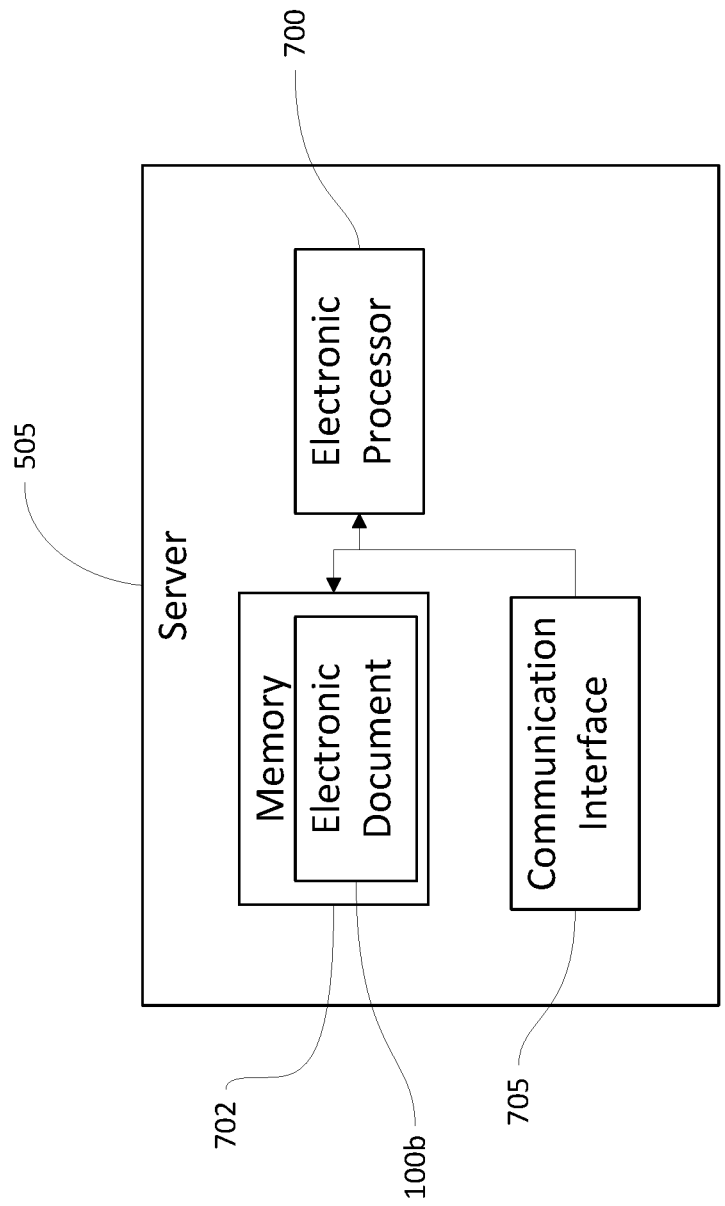
FIG. 6 schematically illustrates a server included in the system of FIG. 4 according to some embodiments.

FIG. 6 schematically illustrates the server 505 according to some embodiments. As illustrated in FIG. 6, the server 505 is an electronic computing device that includes an electronic processor 700 (for example, a microprocessor, application-specific integrated circuit (ASIC), or another suitable electronic device), a memory 702 (a non-transitory, computer-readable storage medium), and a communication interface 705, such as a transceiver, for communicating over the communication network(s) 520 and, optionally, one or more additional communication networks or connections. The electronic processor 700, the memory 702, and the communication interface 705 communicate wirelessly, over one or more communication lines or buses, or a combination thereof. It should be understood that the server 505 may include additional components than those illustrated in FIG. 6 in various configurations and may perform additional functionality than the functionality described herein. Furthermore, the functionality described herein as being performed by the server 505 may be performed in a distributed nature via a plurality of servers or similar devices included in a cloud computing environment.

As noted above, the in some embodiments, the server 505 is configured (through execution of one or more software applications by the electronic processor 700) provide the functionality described herein as being performed by the productivity application 620. In other words, the server 505 may be configured to provide the functionality described herein as being performed by the productivity application 620 as a cloud or hosted service. In addition or alternatively, the server 505 can store electronic documents (such as electronic document 100b illustrated in FIGS. 4 and 6), which user devices can request access to for use with the productivity application 620. For example, in some embodiments, the server 505 acts as a cloud storage service for electronic documents, which user devices can access to create and edit electronic documents, including creating and adding annotations to an electronic document as described herein. For example, as illustrated in FIG. 4, in some embodiments, the user device 515 locally stores an electronic document 100a, which can be created and/or edited via the productivity application 620. However, as illustrated in FIG. 4, the user device 510 may access the electronic document 100b via the server 505 (by sending a request to the server 505) and can create and/or edit this document 100b via the productivity application 620. It should be understood that when the functionality described is provided in a hosted or cloud service configuration, the server 505 storing electronic documents may be the same server or a separate server than the server (or servers) providing productivity functionality as described herein in such a hosted or cloud service configuration.

Figure 7:
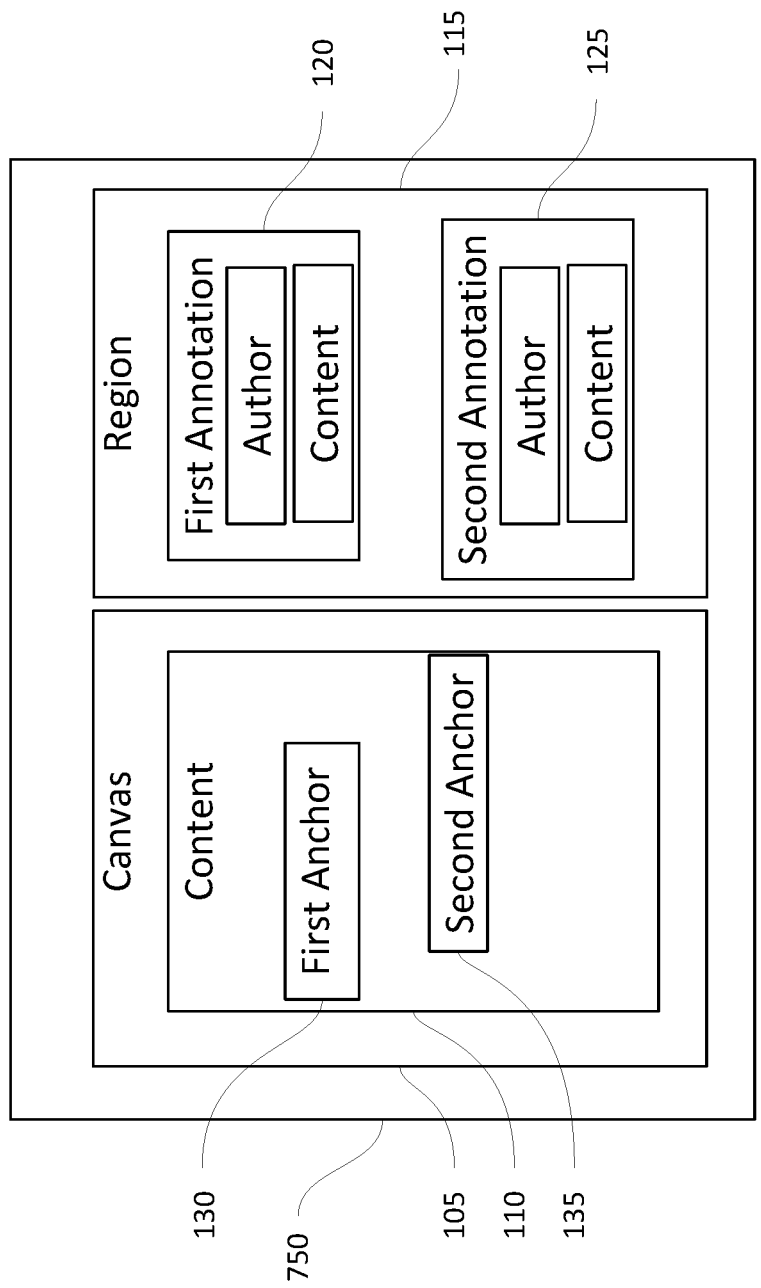
FIG. 7 schematically illustrates a user interface displaying an electronic document according to some embodiments.

FIG. 7 illustrates a user interface 750 generated by the productivity application 620 for displaying content included in an electronic document, such as the electronic document 100a or 100b, as well as annotations associated with the electronic document. As illustrated in FIG. 7, the user interface 750 includes a canvas 105 and a region 115. The canvas 105 displays content 110 (at least a portion of) included in an electronic document, and the region 115 displays a plurality of annotations associated with the electronic document. In some embodiments, both the canvas 105 and the region 115 are scrollable, wherein the region 115 is scrollable independent from the canvas 105 and vice versa. As illustrated in FIG. 7, the plurality of annotations includes a first annotation 120 and a second annotation 125 (although it should be understood that the plurality of annotations can include many more annotations than two).

Annotations include extra content, information, or metadata specific to a range of content (for example, text, an image, a graphic, or the like) within the electronic document. For example, annotations can include proofing or grammar marks and suggestions as well as comments that support commentary for making notes, replying to notes, resolving notes, instructing changes, and mentioning or alerting particular users ("@username"). The range of content associated with an annotation is referred to herein as the anchor associated with the annotation. For example, in FIG. 7, the first annotation 120 is associated with a first anchor 130 and the second annotation 125 is associated with a second anchor 135.

In the example illustrated in FIG. 7, each annotation includes content (e.g., text, an image, a graphic, or the like) and an indication of the user (author) that created the annotation. However, annotations may include other information not illustrated in FIG. 7, such as a time the annotation was created, whether the annotation has related annotations (for example, replies), or the like. It should be understood that the electronic document 100b may include any number of annotations and the two annotations 120, 125 illustrated in FIG. 7 are purely for illustrative purposes. Also, in some embodiments, the region 115 may be sized or positioned differently than as illustrated in FIG. 7. For example, the region 115 may be displayed below or above the canvas 105, may overlap with the canvas 105, or be included in the canvas 105.

Figure 3:
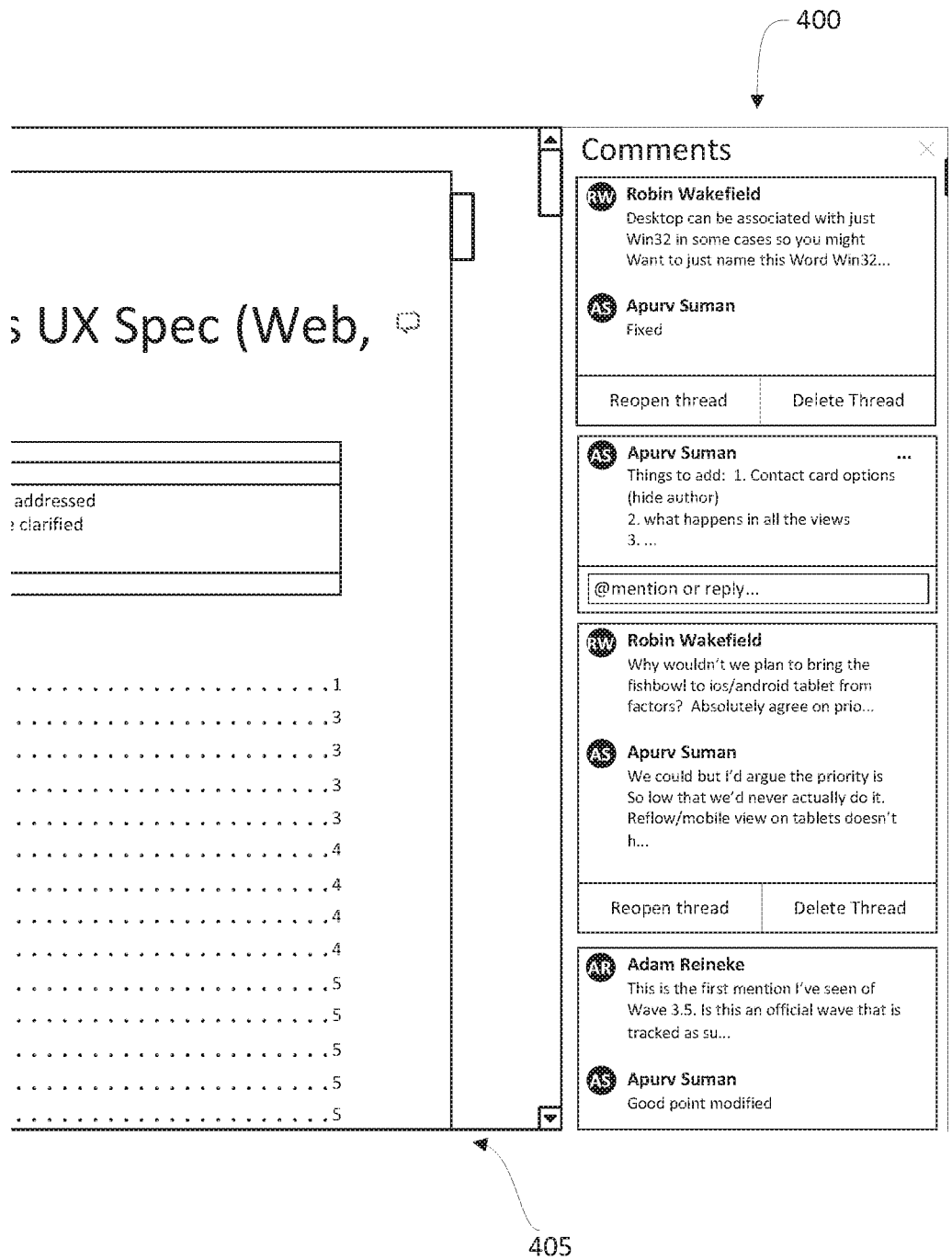
FIG. 3 is an illustrative example of a method of displaying annotations in an electronic document by using a pane displayed alongside a canvas to display annotations associated with the canvas.

As described in more detail below, by default (without requiring a user to select or take other actions), the scrollable region 115 displays annotations for a currently displayed subset of content of the electronic document (paragraph, page, section, region, chapter, or the like). For example, when the canvas 105 displays a first page of the electronic document, the region 115 includes only those annotations having an anchor included in (or spanning) the first page. Limiting the annotations displayed in the region 115 to a subset of all annotations for the electronic document limits the number of annotations that are displayed, which reduces clutter and prevents the density or size of annotations for one subset of content to impact (clutter) other subsets of content. Also, because the region 115 is scrollable independent from the canvas 105 (when the annotations exceed a size of the region 115), a user can easily review the annotations for the subset of the content without changing the content displayed in the canvas 105. Furthermore, the annotations displayed within the region 115 are aligned in at least one dimension (for example, vertically) to position each annotation aligned with (adjacent to or proximate to) the corresponding anchor. This alignment creates spacing within the region 115 of the annotations that is based on or matches the spacing of the associated anchors. Accordingly, the region 115 addresses the need for annotations to be near their anchors while handling situations where there is a high density of annotations and, thus, space constraints. Furthermore, as compared to merely providing a separate pane of annotations as described above with respect to FIG. 3, the region 115 retains relative spacing between the annotations to provide (by default) visual links between the annotations and the associated content.

Figure 8:
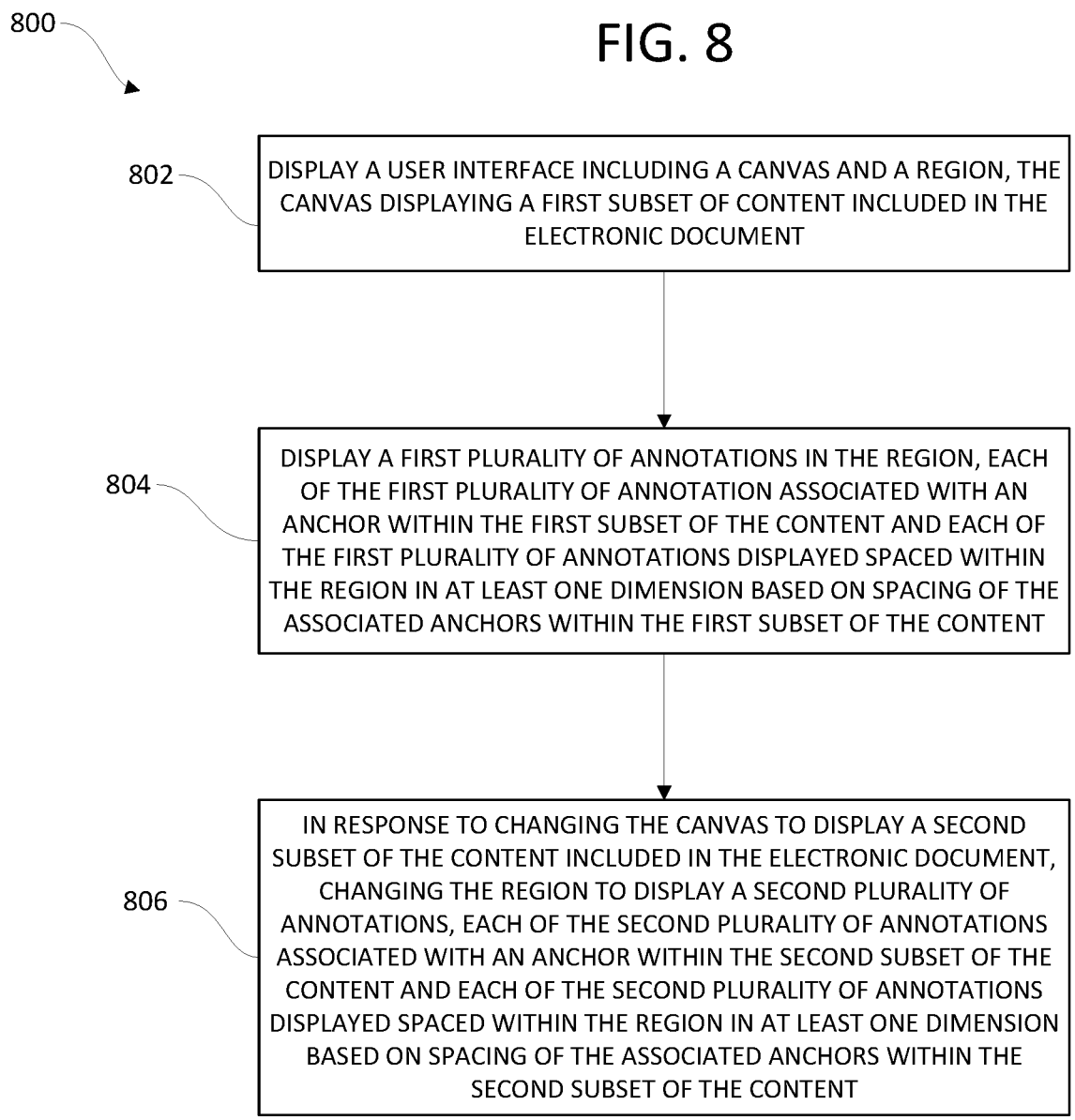
FIG. 8 is a flowchart illustrating of a method of displaying annotations associated with an electronic document according to some embodiments.

For example, FIG. 8 illustrates a method 800 of displaying annotations associated with an electronic document according to one embodiment. The method 800 is described herein as being performed by the productivity application 620 as executed by the electronic processor 600 included in the user device 515. However, as noted above, all or a portion of this functionality may be performed by other devices, such as the server 505 or by multiple servers in a distributed nature. The method 800 is also described with respect to the user interface 750 illustrated in FIG. 7. However, as noted above, this user interface 750 is merely one example configuration of the user interface and other configurations are possible.

As illustrated in FIG. 8, the method 800 includes displaying the user interface 750 on the display device (at block 802). As described above, the user interface 750 includes the canvas 105 and the region 115. As described above with respect to FIG. 7, the canvas 105 displays content included in the electronic document (at least a portion) and the region 115 is scrollable independent from the canvas 105. As also noted above, the canvas 105 may also be scrollable and may be scrollable independent from the region 115. When the method 800 is performed by the electronic processor 600 included in the user device 515, the user interface is displayed on the display device 615 and the electronic processor 700 displays the user interface by transmitting the user interface to the display device 615 (wirelessly or via one or more lines or busses included in the user device 515). However, when the method 800 is performed by the server 505 providing a hosted or cloud-based service, the user is still displayed on the display device 615 but, because the display device is external to the server 505, the server 505 displays the user interface by communicating with the display device 615 over the communication network(s) 520.

As illustrated in FIG. 8, the method 800 also includes displaying a first plurality of annotations in the region 115 (at block 804). Each of the first plurality of annotations is associated with an anchor within the first subset of the content (currently displayed within the canvas 105), and each of the first plurality of annotations displayed spaced within the region 115 in at least one dimension based on spacing of the associated anchors within the first subset of the content.

Figure 9:
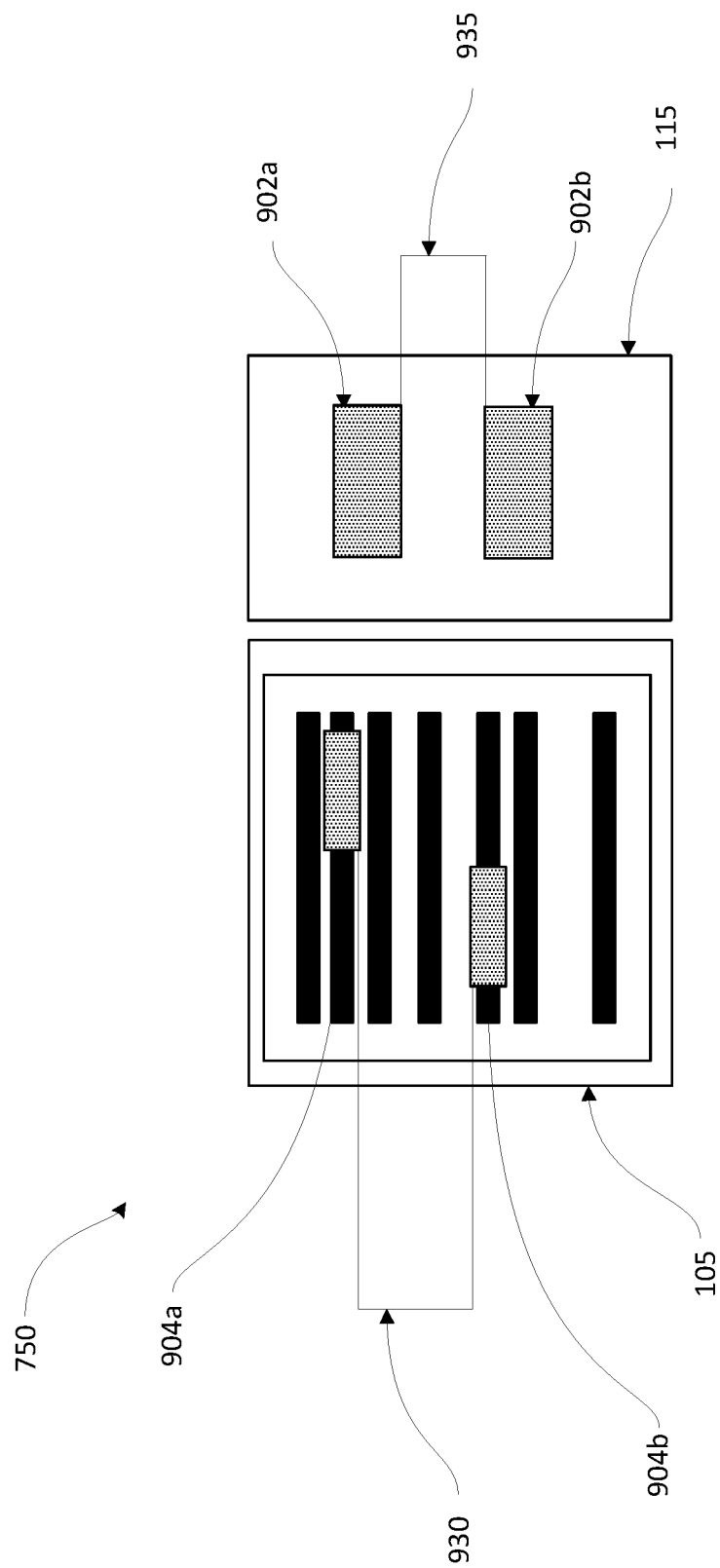

For example, FIG. 9 illustrates the user interface 750 including the region 115, wherein the spacing of the annotations 902a, 902b displayed in the region 115 is based on the spacing between associated anchors. As illustrated in FIG. 9, the annotations 902a, 902b are listed vertically within the region 115, but the spacing between the annotations 902a, 902b is based on (matches) spacing between the anchors 904a, 904b corresponding to the annotations 902a, 902b. In other words, the closer two anchors 904a, 904b are within the content displayed in the canvas 105, the closer the two associated annotations 902a, 902b are displayed within the region 115 and vice versa. In some embodiments, the vertical distance between annotations 902a, 902b may be the same as the vertical distance between the anchors 904a, 904b associated with the annotations 902a, 902b. However, in other embodiments, the vertical distance between annotations 902a, 902b is a fraction of the vertical distance between the associated anchors 904a, 904b, such as one-half, three-quarters, twice, or triple the vertical distance.

In particular, in the example illustrated in FIG. 9, the first annotation 902a in the region 115 is associated with the first anchor 904a included in the canvas 105 and the second annotation 902b in the region 115 is associated with the second anchor 904b included in the canvas 105. A vertical distance 930 separates the first anchor 904a and the second anchor 904b. Therefore, the first annotation 902a and the second annotation 904a are separated in the region 115 by a vertical distance 935 that is the same as the vertical distance 930, which aligns the annotations 902a, 902b with their associated anchors 904a, 904b. However, as noted above, the vertical distance 935 may be based on the vertical distance 930 (without being the same) while still retaining the relative spacing of the annotations 902a, 902b with respect to the anchors 904a, 904b.

Figure 10:
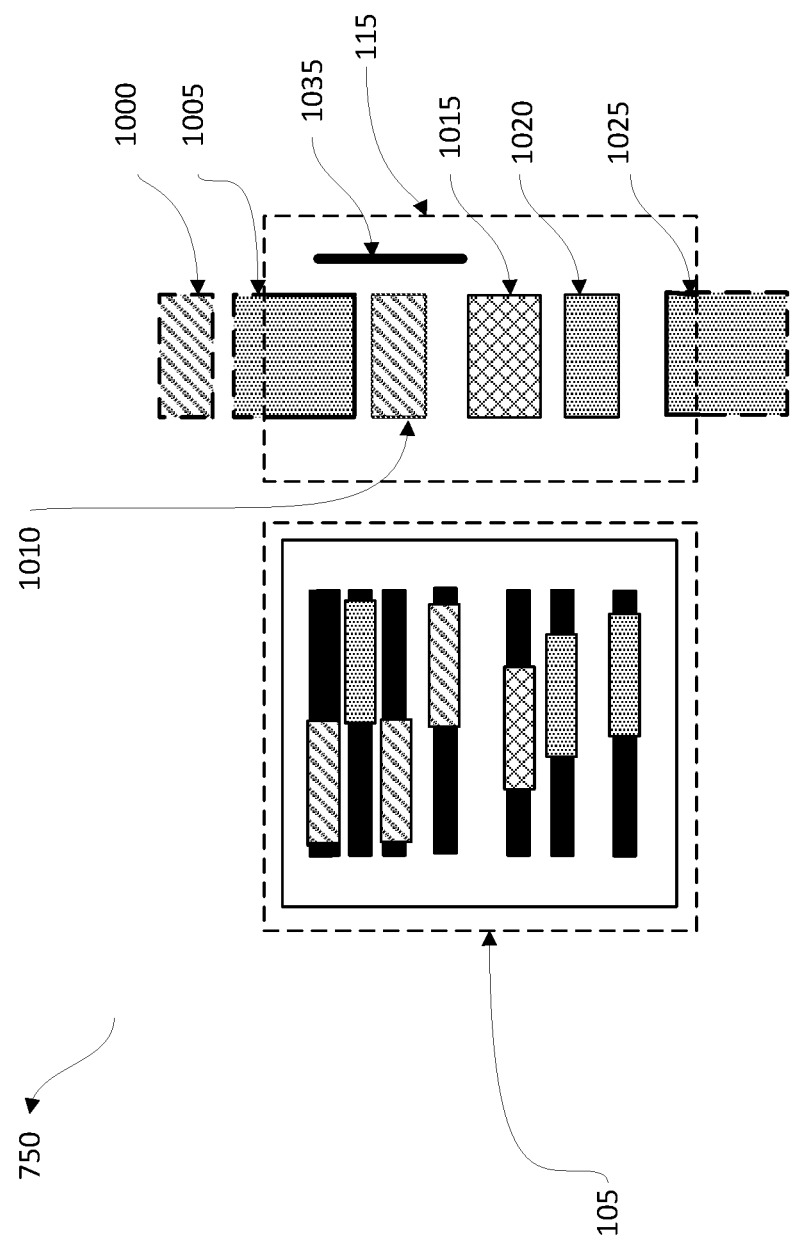

As described above, the region 115 is scrollable. For example, as illustrated in FIG. 10, when there are more annotations 1000, 1005, 1010, 1015, 1020, 1025 associated with a subset of the content displayed in the canvas 105 of a user interface 100 than can be displayed in the region 115 at once (based on the size of the annotations 1000, 1005, 1010, 1015, 1020, and 1025 and the size of the region 115), the region 115 is (or becomes) scrollable. For example, as illustrated in FIG. 10, the user interface 750 (for example, the region 115) includes a scrollbar 1035 that a user can interact with to change annotations displayed within the region 115. In particular, when the electronic processor 600 receives a selection of the scrollbar 1035 and an indication of an upwards or downwards movement, the electronic processor 600 changes the annotations displayed within the region 115 based on whether an indication of an upwards movement or an indication of a downwards movement was received. The scrolling may include a full paging of the annotations (displaying a completely new set of annotations within the region 115) or a step-wise scrolling of the annotations (displaying additional annotations or portions thereof within the region 115). Accordingly, in some embodiments, when the scrollbar 1035 is selected and moved (for example, upward or downward), the region 115 is scrolled to display a new set of annotations, wherein each of the annotations in the new set are still associated with an anchor in the currently-displayed subset of the content and may include at least one annotation (or a portion thereof) that was displayed in the region 115 prior to the selection and movement of the scrollbar 1035. It should be noted that only a portion of the currently-displayed subset may be displayed but each annotation associated with the subset may be displayed via movement of the scrollbar 1035 regardless of whether an anchor the annotation is associated with is within the currently-displayed portion of the subset. Furthermore, as the region 115 is scrolled, the spacing of the annotations displayed in the region is maintained based on the spacing of the associated anchors within the displayed subset of the content. Thus, this spacing continues to provide visual information to a user even as the region 115 is scrolled and, consequently, annotations may no longer be aligned (vertically) with their associated anchor in the displayed subset of the content.

Figure 11:
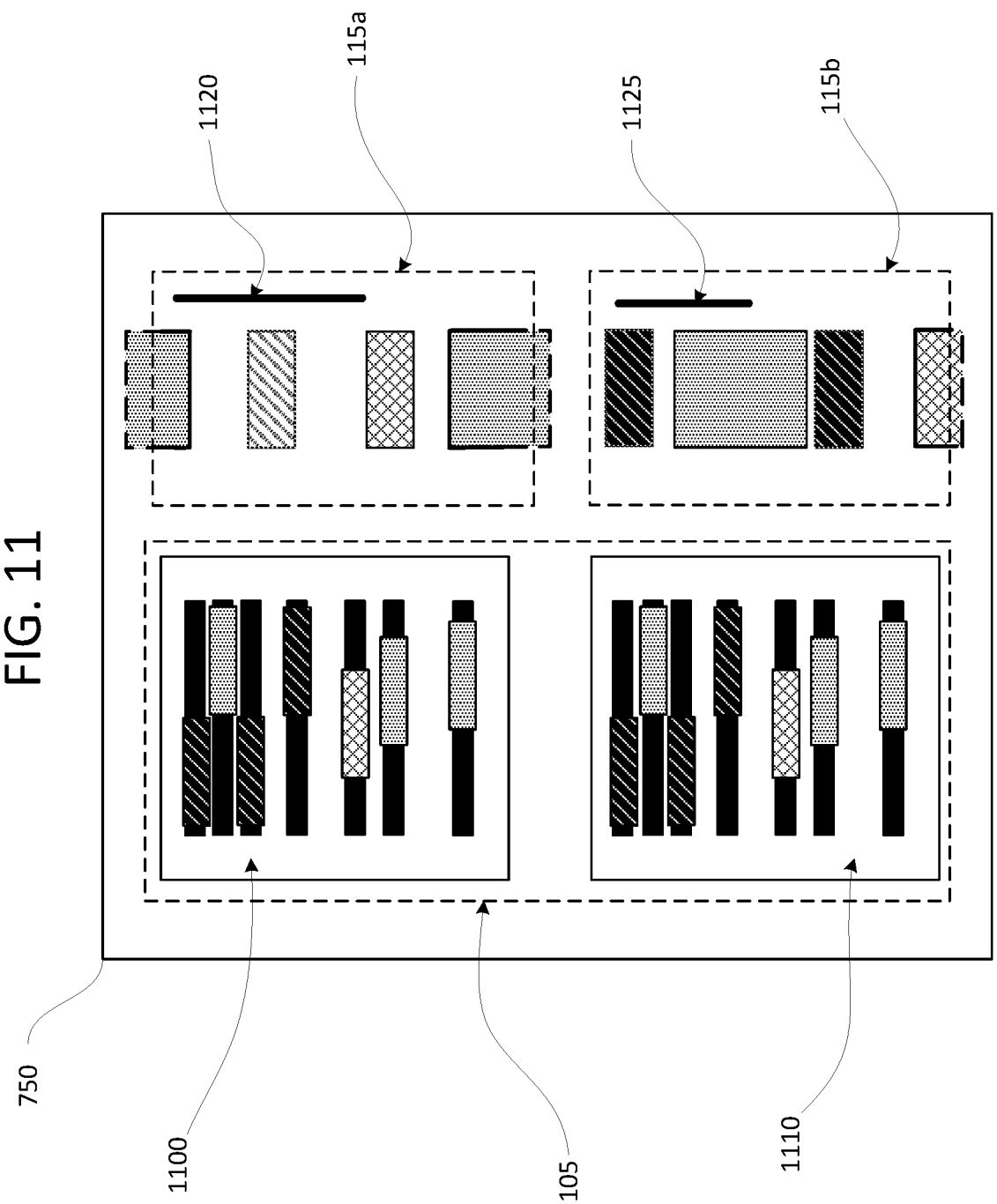

It should be understood that the annotations illustrated (wholly or partially) in dash line in FIGS. 10 through 12 are not displayed (wholly or partially) within a region based on the current scroll position. However, these annotations (or portions thereof) are illustrated in FIGS. 10 through 12 for illustrative purposes to represent that a region is scrollable to view the full list of annotations associated with the currently-displayed subset of content. It should also be understood that other mechanisms, different from a scrollbar, may also be used to view the full list of annotations associated with a region.

As noted above, the canvas 105 may also be scrollable. In some embodiments, the canvas 105 is scrollable independent from the region 115. However, in other embodiments, as the canvas 105 is scrolled, the region 115 may also be automatically scrolled to retain alignment between the annotations and the associated anchors. Furthermore, in some embodiments, in response to a user selecting an annotation displayed within the region, the canvas 105 is automatically scrolled (independent of the region 115) to position the anchor associated with the selected annotation at a predetermined position within the canvas 105 (for example, a top of the canvas 105, a center of the canvas 105, or the like).

Returning to FIG. 8, the method 800 also includes, in response to changing the canvas 110 to display a second subset of the content included in the electronic document (for example, a different page than the previously displayed page of the electronic document), changing the region 115 to display a second plurality of annotations in the region 115 (at block 806). Similar to the first plurality of annotations, each of the second plurality of annotations is displayed spaced within the region 115 in at least one dimension based on spacing of the associated anchor within the second subset of the content. Also, like the first plurality of annotations described above, the second plurality of annotations are scrollable within the region 115. Accordingly, the annotations displayed in the region 115 are updated (existing annotations are removed and replaced with new annotations) to include only the annotations associated with the currently-displayed subset of content included in the electronic document (as displayed in the canvas 105). As noted above, limiting the annotations displayed within the region 115 helps limit clutter within the user interface 750 and also prevents a high density of annotations for one subset of the content from affecting the display of other subsets of the content.

In some embodiments, the canvas 105 allows more than one subset of content to be displayed simultaneously within the user interface 750. For example, when the subsets of the content are paragraphs, multiple paragraphs may be simultaneously displayed within the canvas 105. In such situations when a plurality of subsets of the content are displayed simultaneously within the canvas 105 (or a plurality of canvases 105), the region 115 is changed (divided) to include multiple scrollable sub-regions, wherein each sub-region displays annotations associated with the one of the displayed subsets of content. To retain alignment between annotations and anchors, each sub-region may be displayed aligned with (vertically) the displayed subset of content the sub-region relates to.

In one example, as illustrated in FIG. 11, the canvas 105 may display a plurality of subsets of content of an electronic document, such as multiple pages (or at least portions of multiple pages) displayed vertically one after another (vertically tiled). As illustrated in FIG. 11, in this embodiment, the region 115 is divided in a plurality of sub-regions 115a, 115b. Each sub-region 115a, 115b is associated with one subset of the content. For example, a first subset of content 1100 is associated with a first sub-region 115a and a second subset 1110 is associated with a second section sub-region 115b. In the embodiment illustrated in FIG. 11, each sub-region 115a, 115b is displayed at a position horizontally adjacent to its associated subset of content 1100, 1110. Similar to the region 115 described above, when there are more annotations associated with a subset of content than can be displayed in the associated sub-region, the sub-region is (or becomes) scrollable (via a first scrollbar 1120 and a second scrollbar 1124 as illustrated in FIG. 11). As also described above for the region 115, each sub-region may be scrollable independent from the associated canvas and independent from the other sub-regions.

In another example, as illustrated in FIG. 12, the canvas 105 and a canvas 1200 may each display a subset of content of an electronic document, such as a page (or at least a portion of a page). Similar to the embodiment illustrated in FIG. 11, in the embodiment illustrated in FIG. 12, the region 115 is divided into a plurality of sub-regions 115a, 115b. Unlike the embodiment illustrated in FIG. 11, in the embodiment illustrated in FIG. 12 multiple canvases are displayed, wherein each canvas displays a subset of content of an electronic document. For example, the arrangement of canvases illustrated in FIG. 12 may represent a side-by-side view, wherein multiple subsets (pages) of an electronic document are displayed at the same time (in a non-vertical arrangement). Each sub-region 115a, 115b is associated with one subset of the content. For example, the first subset of content 1100 is associated with the first sub-region 115a and the second subset 1110 is associated with the second section sub-region 115b. In the embodiment illustrated in FIG. 12, the subsets 1100, 1110 and their associated sub-regions 115a and 115b are displayed side by side in a horizontal manner. Similar to the region 115 described above, when there are more annotations associated with a subset of content than can be displayed in the associated sub-region, the sub-region is (or becomes) scrollable (via a first scrollbar 1120 and a second scrollbar 1125 as illustrated in FIG. 11). As also described above for the region 115, each sub-region may be scrollable independent from the associated canvas and independent from the other sub-regions.

Thus, embodiments described herein provide systems and methods for displaying annotations associated with an electronic document to retain annotations close to the content the annotation relates to (the corresponding anchor) while handling a high density of annotations without hiding, truncating, or other limiting information made available to a user. While the examples have been described and illustrated herein as being provided with a word processing productivity software (for example, Word® provided by Microsoft Corporation), it should be understood that the embodiments described herein are not limited to any specific productivity software. For example, embodiments described herein may be applied to any type of productivity application allowing annotations for content, including, for example, presentation productivity software (for example, PowerPoint® provided by Microsoft Corporation). Accordingly, it should be understood that the electronic document may include a word processing file, a spreadsheet file, a presentation (slideshow) file, a web page file, a code file, a video file, a message file, or any other type of content having annotations. Also, in some embodiments, a region may be provided for different types of annotations. For example, in some embodiments, a region may be provided adjacent to one side of a canvas for comments and another region may be provided adjacent to the other side of the canvas for proofing or grammar markings and related content.

Various features and advantages of some embodiments are set forth in the following claims.

What is claimed is:

1. A system for displaying annotations associated with an electronic document, the system comprising:
    an electronic computing device comprising:
        an electronic processor configured to:
        display a user interface on a display device, the user interface including a canvas and a region, the canvas displaying a first subset of content included in the electronic document and the region scrollable independent from the canvas,
        display a first plurality of annotations in the region, each of the first plurality of annotations associated with an anchor within the first subset of the content, and
        in response to changing the canvas to display a second subset of the content included in the electronic document, change the region to display a second plurality of annotations in the region, wherein spacing between two consecutively-displayed annotations within the independently-scrollable region is varied based on spacing, within the canvas, between two anchors associated with the two consecutively-displayed annotations.

2. The system of claim 1, wherein the first subset of the content included in the electronic document includes a page of the electronic document and the second subset of the content included in the electronic document includes a different page of the electronic document.

3. The system of claim 1, wherein the electronic processor is configured to display the first plurality of annotations in the region by displaying the first plurality of annotations vertically within the region, wherein each of the first plurality of annotations is positioned vertically within the region at a position aligned with the associated anchor in the first subset of the content.

4. The system of claim 1, wherein the canvas is scrollable and the electronic processor is further configured to, in response to selection of the one of the plurality of first annotations in the region, automatically scroll the canvas to position the anchor associated with the one of the plurality of first annotations at a predetermined position within the canvas.

5. The system of claim 4, wherein the predetermined position includes at least one selected from a group consisting of a top of the canvas and a center of the canvas.

6. The system of claim 4, wherein the electronic processor is configured to automatically scroll the canvas independent of the region.

7. The system of claim 1, wherein the region includes a scrollbar and wherein the electronic processor is further configured to, in response to selection and movement of the scrollbar when the region displays the first plurality of annotations, scroll the region to display a third plurality of annotations, each of the third plurality of annotations associated with an anchor in the first subset of the content.

8. The system of claim 7, wherein the third plurality of annotations includes at least one of the first plurality of annotations.

9. The system of claim 7, wherein each of the third plurality of annotations is displayed spaced within the region in at least one dimension based on spacing of the associated anchors within the first subset of the content.

10. The system of claim 1, wherein the electronic processor is further configured to, in response to the canvas displaying a plurality of subsets of the content included in the electronic document, change the region to a plurality of sub-regions, wherein each of the plurality of sub-regions displays one or more annotations associated with one of the plurality of subsets of the content.

11. The system of claim 10, wherein each of the plurality of sub-regions is scrollable independent from the canvas and independent from the other sub-regions.

12. The system of claim 1, wherein the display device is external to the electronic computing device and the electronic processor is configured to display the user interface by communicating with the display device over at least one communication network.

13. The system of claim 1, wherein the electronic document includes at least one selected from a group consisting of a word processing file, a presentation file, and a spreadsheet file.

14. A method for displaying annotations associated with an electronic document, the method comprising:
displaying, with an electronic processor, a user interface on a display device, the user interface including a canvas and a region, the canvas displaying a first subset of content included in the electronic document and the region scrollable independent from the canvas;
displaying, with the electronic processor, a first plurality of annotations in the region, each of the first plurality of annotations associated with an anchor within the first subset of the content; and
in response to changing the canvas to display a second subset of the content included in the electronic document, changing, with the electronic processor, the region to display a second plurality of annotations in the region, wherein spacing between two consecutively-displayed annotations within the independently-scrollable region is varied based on spacing, within the canvas, between two anchors associated with the two consecutively-displayed annotations.

15. The method of claim 14, wherein displaying the first plurality of annotations in the region includes displaying the first plurality of annotations vertically within the region, wherein each of the first plurality of annotations is positioned vertically within the region at a position aligned with the associated anchor in the first subset of the content.

16. The method of claim 14, further comprising, in response to selection of the one of the plurality of first annotations in the region, automatically scrolling the canvas to position the anchor associated with the one of the plurality of first annotations at a predetermined position within the canvas, wherein the canvas is automatically scrolled independent from the region.

17. The method of claim 14, further comprising, in response to selection and movement of a scrollbar included in the region when the region displays the first plurality of annotations, scrolling the region to display a third plurality of annotations, each of the third plurality of annotations associated with an anchor in the first subset of the content, each of the third plurality of annotations displayed spaced within the region in at least one dimension based on spacing of the associated anchors within the first subset of the content.

18. A non-transitory computer-readable medium storing instructions that, when executed by an electronic processor, perform a set of functions, the set of functions comprising:
displaying a user interface on a display device, the user interface including a canvas and a region, the canvas displaying a first subset of content included in the electronic document and the region scrollable independent from the canvas;
displaying a first plurality of annotations in the region, each of the first plurality of annotations associated with an anchor within the first subset of the content; and
in response to changing the canvas to display a second subset of the content included in the electronic document, changing the region to display a second plurality of annotations in the region, wherein spacing between two consecutively-displayed annotations within the independently-scrollable region is varied based on spacing, within the canvas, between two anchors associated with the two consecutively-displayed annotations.

19. The non-transitory computer-readable medium of claim 18, wherein displaying the first plurality of annotations within the region includes displaying the first plurality of annotations vertically within the region, wherein each of the first plurality of annotations is positioned vertically within the region at a position aligned with the associated anchor in the first subset of the content.

20. The non-transitory computer-readable medium of claim 18, the set of functions further comprising, in response to the canvas displaying a plurality of subsets of the content included in the electronic document, change the region to a plurality of sub-regions, wherein each of the plurality of sub-regions displays one or more annotations associated with one of the plurality of subsets of the content and wherein each of the plurality of sub-regions is scrollable independent from the canvas and independent from the other sub-regions.

* * * * *